(12) United States Patent
Ditsch

(10) Patent No.: US 8,604,260 B2
(45) Date of Patent: Dec. 10, 2013

(54) BIOMASS PYROLYSIS CONVERSION PROCESS WITH HIGH OLEFIN PRODUCTION AND UPGRADE

(75) Inventor: Andre Ditsch, Houston, TX (US)

(73) Assignee: KiOR, Inc., Pasadena, TX (US)

( * ) Notice: Subject to any disclaimer, the term of this patent is extended or adjusted under 35 U.S.C. 154(b) by 337 days.

(21) Appl. No.: 13/032,399

(22) Filed: Feb. 22, 2011

(65) Prior Publication Data

US 2011/0283601 A1    Nov. 24, 2011

Related U.S. Application Data

(60) Provisional application No. 61/345,921, filed on May 18, 2010.

(51) Int. Cl.
*C10L 1/00* (2006.01)

(52) U.S. Cl.
USPC ........... 585/240; 585/242; 585/357; 585/469; 585/638; 585/733; 44/307; 44/605; 44/606

(58) Field of Classification Search
USPC ................. 585/240, 242, 357, 469, 638, 733; 44/307, 605–606
See application file for complete search history.

(56) References Cited

U.S. PATENT DOCUMENTS

| | | | |
|---|---|---|---|
| 3,960,978 A | 6/1976 | Givens et al. | |
| 4,587,370 A * | 5/1986 | DeGraff | 585/450 |
| 4,613,580 A * | 9/1986 | Frame | 502/117 |
| 4,678,860 A | 7/1987 | Kuester | |
| 4,831,204 A | 5/1989 | Kushnerick et al. | |
| 4,912,273 A * | 3/1990 | Harandi et al. | 585/322 |
| 4,980,053 A | 12/1990 | Li et al. | |
| 5,389,232 A | 2/1995 | Adewuyi et al. | |
| 5,504,259 A | 4/1996 | Diebold et al. | |
| 6,179,993 B1 | 1/2001 | Seimandi et al. | |
| 7,312,370 B2 | 12/2007 | Pittman et al. | |
| 8,277,643 B2 * | 10/2012 | Huber et al. | 208/400 |
| 2006/0276679 A1 | 12/2006 | Little et al. | |
| 2009/0227823 A1 | 9/2009 | Huber et al. | |

FOREIGN PATENT DOCUMENTS

WO    WO2008/020047    2/2008

OTHER PUBLICATIONS

Quann, R.J. et al. (1988). Ind. Eng. Chem. Res., 27, 565-570.*

* cited by examiner

*Primary Examiner* — Brian McCaig
(74) *Attorney, Agent, or Firm* — Dunlap Codding, P.C.

(57) ABSTRACT

Disclosed is a process for biomass conversion in a catalytic pyrolysis reactor to convert such to liquid hydrocarbons which includes conditions which favor increased olefin production; wherein the olefins are then upgraded alone or with the produced bio-oil to fuel range hydrocarbons.

15 Claims, 2 Drawing Sheets

BIOMASS PYROLYSIS CONVERSION PROCESS WITH HIGH OLEFIN PRODUCTION AND UPGRADE

BACKGROUND OF THE INVENTION

1. Field of the Invention

The invention relates generally to the high severity conversion of biomass in the presence of a catalyst to produce an olefin rich product, and more particularly to the high severity conversion of biomass to an olefin rich product with the subsequent upgrade of the olefins and other produced hydrocarbons to a fuel of higher quantity and increased value.

2. Description of the Related Art

Pyrolysis, in particular flash pyrolysis, has been proposed as a process for converting solid biomass material to liquid products. Pyrolysis in general refers to a process in which a feedstock is heated in an oxygen-poor or oxygen-free atmosphere. If solid biomass is used as the feedstock of a pyrolysis process, the process produces gaseous, liquid, and solid products. It has been found that the liquid yield can be increased, at the expense of the gas and solid yields, by operating the pyrolysis process such that the feedstock is heated rapidly, and the reaction time is kept short. However, it can also be advantageous to increase the production of olefinic gaseous products which can be upgraded to high value liquid fuels. In flash pyrolysis, the time for heating and reacting the biomass feedstock is on the order of seconds.

Because of the fuel quality and quantity benefits, it is desirable to develop improved methods/systems for biomass conversion wherein olefin production is maximized with subsequent olefin/bio-oil upgrade.

BRIEF SUMMARY OF THE INVENTION

In accordance with an embodiment of the present invention, a process is provided comprising:
a) converting a biomass feed in a reaction zone to reaction products comprising: i) bio-oil and ii) light gases comprising non-condensables, light paraffins, and olefins;
b) separating the reaction products into a liquid bio-oil stream comprising at least a portion of the bio-oil, and a gas stream comprising at least a portion of the olefins;
c) converting at least a portion of the olefins of the gas stream in a conversion zone to a conversion product stream comprising hydrocarbons having at least five carbon atoms per molecule.

In accordance with another embodiment of the present invention, a process is provided comprising:
a) converting a biomass feed in a reaction zone to reaction products comprising: i) bio-oil and ii) light gases comprising non-condensables, light paraffins, and olefins;
b) contacting the reaction products with a catalyst, in a conversion zone, for conversion to a conversion product stream by a process selected from the group consisting of: i) reacting at least a portion of the olefins with each other to form hydrocarbons having a greater number of carbon atoms per molecule than the olefins, ii) reacting at least a portion of the olefins with at least a portion of the bio-oil thereby producing a heavier bio-oil, and iii) reacting at least a portion of the olefins with hydrocarbons contained in a hydrocarbon stream separately charged to the conversion zone, and iv) combinations thereof;
c) condensing portions of the conversion product stream to form a gas stream comprising the non-condensables and a liquid stream comprising a liquid bio-oil and water;
d) separating a bio-oil stream comprising the liquid bio-oil from the liquid stream.

BRIEF DESCRIPTION OF THE DRAWINGS

The features and advantages of the invention will be appreciated upon reference to the following drawings, in which.

DETAILED DESCRIPTION OF THE INVENTION

The biomass material useful in the current invention can be any biomass capable of being converted to liquid and gaseous hydrocarbons.

Preferred are solid biomass materials comprising a cellulosic material, in particular lignocellulosic materials, because of the abundant availability of such materials, and their low cost. The solid biomass feed can comprise components selected from the group consisting of lignin, cellulose, hemicelluloses, and combinations thereof. Examples of suitable solid biomass materials include forestry wastes, such as wood chips and saw dust; agricultural waste, such as straw, corn stover, sugar cane bagasse, municipal waste, in particular yard waste, paper, and card board; energy crops such as switch grass, coppice, eucalyptus; and aquatic materials such as algae; and the like.

Figure 1:
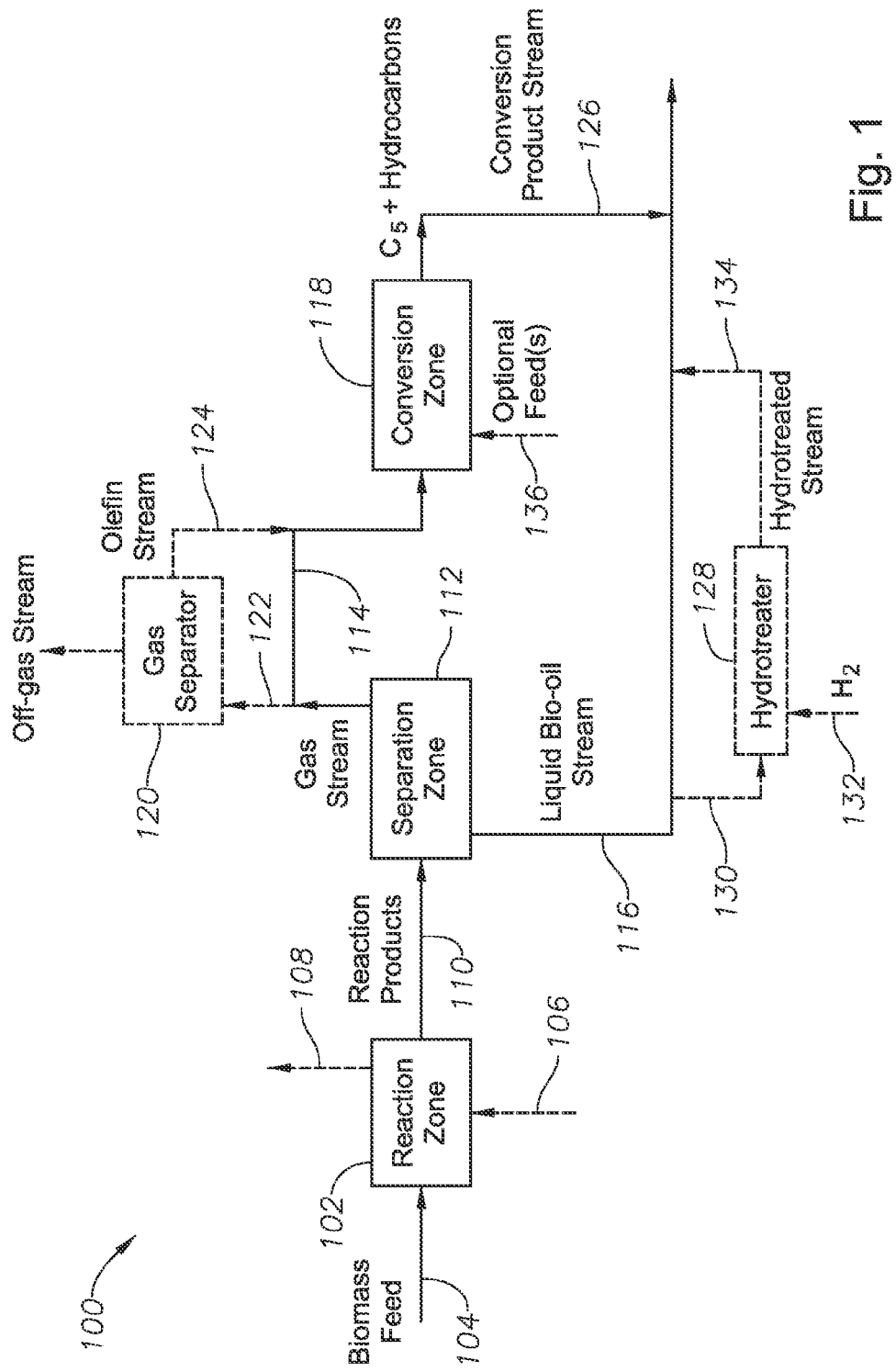
FIG. 1 is a flow diagram showing an embodiment of the present invention.

In accordance with an embodiment of the present invention, a process/system for converting biomass to liquid hydrocarbons comprises, consists of, or consists essentially of the following, described below with reference to FIG. 1.

A biomass conversion process/system 100 wherein biomass feed can be charged to a reaction zone 102 via a conduit 104. A heat carrier material and/or a catalyst can also be charged to reaction zone 102 via conduit 106 for mixture with the biomass feed and to transfer heat thereto; and can be removed from reaction zone 102 via conduit 108. The biomass feed can be converted in reaction zone 102 to reaction products comprising, consisting of, or consisting essentially of: i) bio-oil and ii) light gases comprising non-condensables, light paraffins, and olefins. The reaction products can be removed from reaction zone 102 via conduit 110. The reaction products can be charged to a separation zone 112 via conduit 110 wherein the reaction products can be separated into a liquid bio-oil stream comprising, consisting of, or consisting essentially of at least a portion of the bio-oil, and a gas stream comprising, consisting of, or consisting essentially of at least a portion of the olefins. The gas stream can be removed from separation zone 112 via conduit 114, and the liquid bio-oil stream can be removed from separation zone 112 via conduit 116. The separation zone 112 can also include a condenser and a separator.

The olefins are more particularly selected from the group consisting of ethylene, propylene, butenes, pentenes and combinations thereof. The reaction zone 102 can operate at a temperature in the range of from about 250 to about 600° C., or from about 400 to about 600° C., and in the substantial absence of oxygen.

The reaction products can comprise at least about 5 wt. % olefins, or at least about 8 wt. % olefins. At least a portion of the olefins of the gas stream can then be charged to a conversion zone 118 via conduit 114 for conversion to a conversion product stream comprising, consisting of, or consisting essentially of hydrocarbons having at least five, or between five and fourteen, or between five and nine carbon atoms per molecule.

Additionally, at least a portion of the gas stream can be passed to a gas separator 120 via conduits 114 and 122 and separated into an olefin stream comprising, consisting of, or consisting essentially of the olefins and an off-gas stream comprising non-condensables. Such olefin stream can then be charged to the conversion zone 118 via conduits 124 and 114 along with the rest of, or in place of, the gas stream. The conversion product stream can be removed from conversion zone 118 via conduit 126.

The conversion product stream can then be mixed with the liquid bio-oil stream via conduits 126 and 116, respectively, for further processing or to form a fuel or fuel blending stock. At least a portion of the liquid bio-oil stream can also be charged to a hydrotreater 128 via conduits 116 and 130 and then hydrotreated with hydrogen charged to hydrotreater 128 via conduit 132 to form a hydrotreated stream comprising less oxygen atoms per molecule than the bio-oil stream. The hydrotreated stream can then be mixed with the conversion product stream via conduits 134 and 116 to form a fuel or fuel blend (such as for use as a gasoline or a diesel fuel).

The olefins can be converted in the conversion zone 118 by a method selected from the group consisting of alkylation, catalytic polymerization, aromatization, and combinations thereof.

Conversion using alkylation can include charging isobutane to conversion zone 118 via conduit 136 for alkylation with the olefins to form the conversion product stream comprising, consisting of, or consisting essentially of alkylated hydrocarbons having six to eight carbon atoms per molecule. Such alkylated hydrocarbons can be primarily isoparaffins.

Conversion using alkylation can also include charging aromatics to conversion zone 118 via conduit 136, either alone or along with the isobutane described above, for alkylation with the olefins to form at least a portion of the conversion product stream which can comprise, consist of, or consist essentially of alkylated aromatics having from eight to fourteen carbon atoms per molecule. The alkylated aromatics can comprise chemicals selected from the group consisting of ethyl benzene, cumene, and combinations thereof. As a further option, at least a portion of the chemicals can be separated from the conversion product stream for use in further chemical processing.

Conversion by catalytic polymerization can include reacting the olefins with each other over an acidic catalyst contained in conversion zone 118 to form the conversion product stream comprising, consisting of, or consisting essentially of olefinic oligomers having six to twelve carbon atoms per molecule.

The conversion process can also be by aromatization including contacting the olefins with a zeolite catalyst in conversion zone 118 at a temperature in the range of from about 300° C. to about 450° C. to form the conversion product stream comprising, consisting of, or consisting essentially of aromatics and paraffins.

Figure 2:
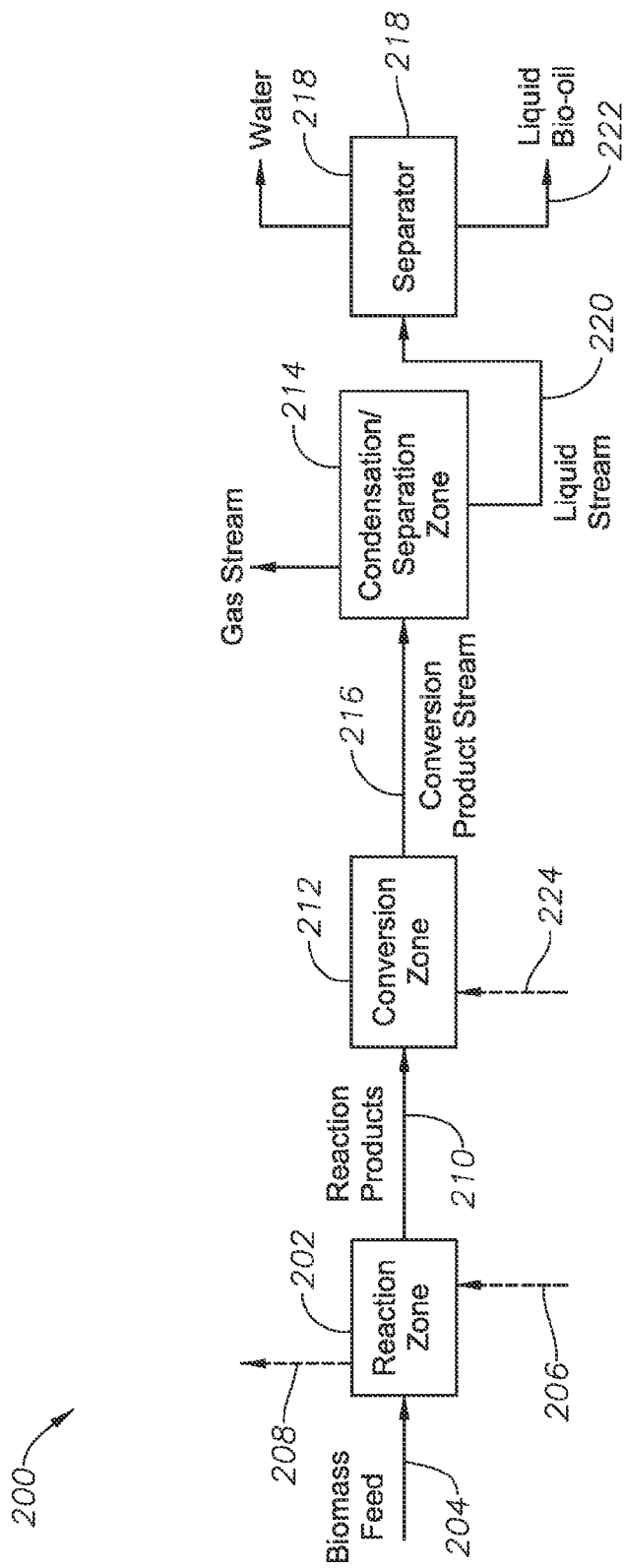
FIG. 2 is a flow diagram showing an embodiment of the present invention.

In accordance with another embodiment of the present invention, a process/system for converting biomass to liquid hydrocarbons comprises, consists of, or consists essentially of the following, described below with reference to FIG. 2.

A biomass conversion process/system 200 wherein biomass feed can be charged to a reaction zone 202 via a conduit 204. A heat carrier material and/or a catalyst can also be charged to reaction zone 202 via conduit 206 for mixture with the biomass feed and to transfer heat thereto; and can be removed from reaction zone 202 via conduit 208. The biomass feed can be converted in reaction zone 202 to reaction products comprising, consisting of, or consisting essentially of: i) bio-oil and ii) light gases comprising non-condensables, light paraffins, and olefins. At least a portion of the reaction products can be removed from reaction zone 202 via conduit 210. The other portion of the reaction products, if any, can be separated and processed in accordance with the discussion above concerning FIG. 1.

The olefins are more particularly selected from the group consisting of ethylene, propylene, butenes, pentenes, and combinations thereof. The reaction zone 202 can operate at a temperature in the range of from about 250 to about 600° C., or from about 400 to about 600° C., and in the substantial absence of oxygen.

The reaction products can comprise at least about 5 wt. % olefins, or at least about 8 wt. % olefins. Also, the reaction products are preferably in a vapor state. The reaction products can then be charged to a conversion zone 212 via conduit 210 wherein the reaction products can be contacted with a catalyst in conversion zone 212 for conversion to a conversion product stream by a process selected from the group consisting of: i) reacting at least a portion of the olefins with each other to form hydrocarbons having a greater number of carbon atoms per molecule than the olefins charged to conversion zone 212, ii) reacting at least a portion of olefins with at least a portion of the bio-oil thereby producing a heavier bio-oil, iii) reacting at least a portion of the olefins with hydrocarbons contained in a hydrocarbon stream separately charged to conversion zone 212 via conduit 224, and iv) combinations thereof.

The conversion product stream is then charged to a condensation/separation zone 214 via conduit 216 wherein portions of the conversion product stream can be condensed thereby forming a gas stream comprising the non-condensables and a liquid stream comprising a liquid bio-oil and water. The liquid stream is then charged to a separator 218 via conduit 220 for separating a bio-oil stream comprising, consisting of, or consisting essentially of the liquid bio-oil from the liquid stream. The bio-oil stream can be removed from separator 218 via conduit 222 for use as a fuel or fuel blend (such as for use as a gasoline or a diesel fuel). The bio-oil stream can be hydrotreated, if needed, to form a hydrotreated stream comprising less oxygen atoms per molecule than the bio-oil stream.

The conversion product stream comprises hydrocarbons having at least five, or between five and fourteen, or between five and nine carbon atoms per molecule. The olefins can be converted in the conversion zone by a method selected from the group consisting of alkylation, catalytic polymerization, aromatization, and combinations thereof.

Conversion can be by alkylation and can include the addition of isobutane to conversion zone 212 via conduit 224 for alkylation with the olefins to form at least a portion of the conversion product stream comprising alkylated hydrocarbons having six to eight carbon atoms per molecule.

Conversion by alkylation can also include: i) alkylating aromatics present in the reaction products with the olefins to form at least a portion of the conversion product stream comprising alkylated aromatics having from eight to fourteen carbon atoms per molecule, ii) alkylating aromatics, contained in a separate aromatic-containing stream charged to conversion zone 212 via conduit 224, with the olefins to form at least a portion of the conversion product stream comprising alkylated aromatics having from eight to fourteen carbon atoms per molecule, and iii) combinations thereof. The alkylated hydrocarbons can comprise chemicals selected from the group consisting of ethyl benzene, cumene, and combinations thereof; and at least a portion of such chemicals can be separated from the conversion product stream for use in further chemical processing.

Conversion can be by catalytic polymerization and can include reacting the olefins with each other over an acidic catalyst to form the conversion product stream comprising olefinic oligomers having six to twelve carbon atoms per molecule.

The conversion process can also be by aromatization including contacting the olefins with a zeolite catalyst in conversion zone 212 at a temperature in the range of from about 300° C. to about 450° C. to form the conversion product stream comprising, consisting of, or consisting essentially of aromatics and paraffins.

The catalyst for the reaction zone can be any catalyst suitable for use in the pyrolytic conversion of biomass. More particularly, the catalyst for the reaction zone can be selected from the group consisting of: a solid base, a clay, an inorganic oxide, an inorganic hydroxide, a zeolite, a supported metal, and combinations thereof. The solid base can be selected from the group consisting of: hydrotalcite; a hydrotalcite-like material; a clay; a layered hydroxy salt; a metal oxide; a metal hydroxide; a mixed metal oxide; or a mixture thereof.

The catalyst for the reaction zone can also be an equilibrium catalyst ("E-cat") from a fluid catalytic cracking ("FCC") unit of an oil refinery. The term refers to catalyst material that has, on average, circulated in the FCC unit for a considerable length of time. The term is used to distinguish fresh catalyst, which has not been exposed to the environment of the FCC unit, and which has much greater catalytic activity than the E-cat. The term E-cat also refers to catalyst material that is removed from the FCC unit, to be replaced with fresh catalyst. This spent catalyst is a waste product from oil refineries, and as such, is abundantly available at low cost.

The reaction zone can include a fluid bed reactor, a moving bed reactor, or a cyclone reactor.

The following example is provided to further illustrate this invention and is not to be considered as unduly limiting the scope of this invention.

EXAMPLE

For the separate runs listed in the Table below, wood was charged to a pyrolysis reactor for contact with kaolin and zeolite catalysts at different inlet riser reaction temperatures. Results from the runs are set out in the Table below.

TABLE

|  | Low Severity Kaolin | High Severity Kaolin | Low Severity Zeolite | High Severity Zeolite |
| --- | --- | --- | --- | --- |
| Riser Intlet Temp., ° F. | 1230 | 1265 | 1230 | 1265 |
| Cat/feed ratio, (wt/wt) | 13.5 | 31.2 | 13.3 | 22.9 |
| Oil Yield, wt % | 27.0 | 8.3 | 24.6 | 10.9 |
| Oxygen in Oil, wt % | 28.1 | 18.2 | 20.2 | 11.9 |
| Coke Yield, wt % | 14.1 | 8.6 | 16.1 | 12.6 |
| Char Yield, wt % | 0 | 0 | 0.2 | 0 |
| C5+ Gasoline, wt % | 9.66 | 4.40 | 11.62 | 6.52 |
| Olefins Total | 2.06 | 7.84 | 3.21 | 9.19 |
| Ethylene | 0.78 | 4 | 1.1 | 4.74 |
| Propadiene | 0.01 | 0.05 | 0.01 | 0.01 |
| Propylene | 0.74 | 2.46 | 1.3 | 3.32 |
| Trans 2 butene | 0.06 | 0.21 | 0.16 | 0.27 |
| 1 butene | 0.21 | 0.43 | 0.12 | 0.2 |
| Isobutylene | 0.06 | 0.14 | 0.14 | 0.23 |
| Cis 2 butene | 0.04 | 0.15 | 0.12 | 0.2 |

TABLE-continued

|  | Low Severity Kaolin | High Severity Kaolin | Low Severity Zeolite | High Severity Zeolite |
| --- | --- | --- | --- | --- |
| Butadiene | 0 | 0 | 0.01 | 0 |
| 3 methyl-1-butene | 0.01 | 0.04 | 0.01 | 0.01 |
| Trans 2 pentene | 0.02 | 0.11 | 0.03 | 0.02 |
| 2 methyl 2 butene | 0.03 | 0.06 | 0.1 | 0.09 |
| 1 pentene | 0.04 | 0.04 | 0.02 | 0.01 |
| 2 methyl 1 butene | 0.03 | 0.04 | 0.05 | 0.05 |
| Cis 2 pentene | 0.03 | 0.11 | 0.04 | 0.04 |

As can be seen from the Table above, as the severity of the biomass conversion is increased (increased temperature and increased catalyst to feed ratio), the oil yield decreases, but with an increase in oil quality reflected in a much lower oxygen content. Also, the higher severity results in significantly higher olefin production (about 3.8 times for Kaolin and 2.9 times for the zeolite). The increases in olefin production resulting from the high severity runs are at quantities sufficient to be considered commercially viable for upgrading per this invention and, once upgraded to fuel range hydrocarbons, will offset a good portion of the resulting lower oil yield. Also, the resulting fuel will have a much lower oxygen content, and thus be of much higher quality and value. Lower oxygen oil is of great value in the fuel industry due to the significant costs of removing oxygen from high oxygen oil by hydrotreating.

While the technology has been particularly shown and described with reference to specific embodiments, it should be understood by those skilled in the art that various changes in form and detail may be made without departing from the spirit and scope of the technology as defined by the appended claims.

That which is claimed is:

1. A process comprising:
   a) converting a biomass feed in a reaction zone to reaction products comprising: i) bio-oil and ii) light gases comprising non-condensables, light paraffins, and olefins;
   b) separating said reaction products into a liquid bio-oil stream comprising at least a portion of said bio-oil, and a gas stream comprising at least a portion of said olefins;
   c) separating said gas stream into an olefin stream comprising said olefins and an off-gas stream comprising non-condensables; and
   d) converting at least a portion of said olefins of said olefin stream in a conversion zone to a conversion product stream comprising hydrocarbons having at least five carbon atoms per molecule.

2. The process of claim 1 wherein said conversion product stream is mixed with said bio-oil stream.

3. The process of claim 1 wherein said bio-oil stream is hydrotreated to form a hydrotreated stream comprising less oxygen atoms per molecule than said bio-oil stream; and mixing said hydrotreated stream with said conversion product stream.

4. The process of claim 1 wherein said olefins are converted in said conversion zone by a method selected from the group consisting of alkylation, catalytic polymerization, aromatization, and combinations thereof.

5. The process of claim 4 wherein said method is alkylation and includes alkylating isobutane with said olefins to form said conversion product stream comprising alkylated hydrocarbons having six to eight carbon atoms per molecule.

6. The process of claim 4 wherein said method is alkylation and includes alkylating aromatics with said olefins to form said conversion product stream comprising alkylated aromatics having from eight to fourteen carbon atoms per molecule.

7. The process of claim 6 wherein said alkylated aromatics comprise chemicals selected from the group consisting of ethyl benzene, cumene, and combinations thereof; and wherein at least a portion of said chemicals are separated from said conversion product stream for use in further chemical processing.

8. The process of claim 4 wherein said method is catalytic polymerization and includes reacting said olefins with each other over an acidic catalyst to form said conversion product stream comprising olefinic oligomers having six to twelve carbon atoms per molecule.

9. The process of claim 4 wherein said method is aromatization and includes contacting said olefins with a zeolite catalyst at a temperature in the range of from about 300° C. to about 450° C. to form said conversion product stream comprising aromatics and paraffins.

10. A process comprising:
   a) converting a biomass feed in a reaction zone to reaction products comprising: i) bio-oil and ii) light gases comprising non-condensables, light paraffins, and olefins;
   b) separating said reaction products into a liquid bio-oil stream comprising at least a portion of said bio-oil, and a gas stream comprising at least a portion of said olefins;
   c) converting at least a portion of said olefins of said gas stream in a conversion zone to a conversion product stream comprising hydrocarbons having at least five carbon atoms per molecule; wherein said reaction zone operates at a temperature in the range of from about 250 to about 600° C., and in the substantial absence of oxygen.

11. A process comprising:
   a) converting a biomass feed in a reaction zone to reaction products comprising: i) bio-oil and ii) light gases comprising non-condensables, light paraffins, and olefins;
   b) contacting said reaction products with a catalyst, in a conversion zone, for conversion to a conversion product stream by a process selected from the group consisting of: i) reacting at least a portion of said olefins with each other to form hydrocarbons having a greater number of carbon atoms per molecule than said olefins, ii) reacting at least a portion of said olefins with at least a portion of said bio-oil thereby producing a heavier bio-oil, iii) reacting at least a portion of said olefins with hydrocarbons contained in a hydrocarbon stream separately charged to said conversion zone, and iv) combinations thereof;
   c) condensing portions of said conversion product stream to form a gas stream comprising said non-condensables and a liquid stream comprising a liquid bio-oil and water; d) separating a bio-oil stream comprising said liquid bio-oil from said liquid stream; wherein said olefins are converted in said conversion zone by catalytic polymerization.

12. The process of claim 11 wherein said method is catalytic polymerization and includes reacting said olefins with each other over an acidic catalyst to form said conversion product stream comprising olefinic oligomers having six to twelve carbon atoms per molecule.

13. The process of claim 11 wherein said bio-oil stream is hydrotreated to form a hydrotreated stream comprising less oxygen atoms per molecule than said bio-oil stream.

14. A process comprising:
   a) converting a biomass feed in a reaction zone to reaction products comprising: i) bio-oil and ii) light gases comprising non-condensables, light paraffins, and olefins;
   b) contacting said reaction products with a catalyst, in a conversion zone, for conversion to a conversion product stream by a process selected from the group consisting of: i) reacting at least a portion of said olefins with each other to form hydrocarbons having a greater number of carbon atoms per molecule than said olefins, ii) reacting at least a portion of said olefins with at least a portion of said bio-oil thereby producing a heavier bio-oil, iii) reacting at least a portion of said olefins with hydrocarbons contained in a hydrocarbon stream separately charged to said conversion zone, and iv) combinations thereof;
   c) condensing portions of said conversion product stream to form a gas stream comprising said non-condensables and a liquid stream comprising a liquid bio-oil and water;
   d) separating a bio-oil stream comprising said liquid bio-oil from said liquid stream; wherein said olefins are converted in said conversion zone by an alkylation method selected from the group consisting of: i) adding isobutane to said conversion zone and alkylating said isobutane with said olefins to form at least a portion of said conversion product stream comprising alkylated hydrocarbons having six to eight carbon atoms per molecule; ii) alkylating aromatics, contained in a separate aromatic-containing stream charged to said conversion zone, with said olefins to form at least a portion of said conversion product stream comprising alkylated aromatics having from eight to fourteen carbon atoms per molecule; and iii) combinations thereof.

15. The process of claim 14 wherein said alkylated aromatics comprise chemicals selected from the group consisting of ethyl benzene, cumene, and combinations thereof; and wherein at least a portion of said chemicals are separated from said conversion product stream for use in further chemical processing.

* * * * *